United States Patent
Nibe et al.

(10) Patent No.: US 8,559,997 B2
(45) Date of Patent: Oct. 15, 2013

(54) METHOD FOR CONTROLLING COMMUNICATION OF RADIO TERMINAL, AND RADIO TERMINAL

(75) Inventors: Keiji Nibe, Kawasaki (JP); Kentaro Fukushima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 799 days.

(21) Appl. No.: 12/003,044

(22) Filed: Dec. 19, 2007

(65) Prior Publication Data

US 2008/0194282 A1 Aug. 14, 2008

(30) Foreign Application Priority Data

Feb. 9, 2007 (JP) ................................ 2007-030209

(51) Int. Cl.
*H04B 7/00* (2006.01)
*H04B 7/185* (2006.01)

(52) U.S. Cl.
USPC ......................................... 455/522; 370/318

(58) Field of Classification Search
USPC ......................................... 455/522; 370/318
See application file for complete search history.

(56) References Cited

U.S. PATENT DOCUMENTS

| | | | |
|---|---|---|---|
| 6,717,924 B2 | 4/2004 | Ho et al. | |
| 7,212,503 B2 | 5/2007 | Ho et al. | |
| 7,433,328 B2 * | 10/2008 | Kim et al. | 370/278 |
| 7,532,595 B2 * | 5/2009 | Nibe | 370/329 |
| 7,542,776 B2 * | 6/2009 | Umesh et al. | 455/522 |
| 7,852,746 B2 * | 12/2010 | Jalali | 370/208 |
| 2003/0100268 A1 | 5/2003 | Moulsley et al. | |
| 2003/0128683 A1 | 7/2003 | Ho et al. | |
| 2004/0157651 A1 | 8/2004 | Ho et al. | |
| 2004/0166888 A1 * | 8/2004 | Ahn et al. | 455/522 |
| 2004/0203980 A1 * | 10/2004 | Das et al. | 455/522 |
| 2005/0025056 A1 | 2/2005 | Chen et al. | |
| 2006/0111119 A1 | 5/2006 | Iochi | |
| 2006/0211391 A1 * | 9/2006 | Nishikawa et al. | 455/226.1 |

(Continued)

FOREIGN PATENT DOCUMENTS

| | | |
|---|---|---|
| EP | 1564905 A2 | 8/2005 |
| EP | 1708524 A1 | 10/2006 |

(Continued)

OTHER PUBLICATIONS

3GPP TS 25.211 V7.0.0 (Mar. 2006); 3rd Generation Partnership Project; Technical Specification Group Radio Access Network; Physical channels and mapping of transport channels onto physical channels (FDD) (Release 7).

(Continued)

*Primary Examiner* — Bobbak Safaipour
(74) *Attorney, Agent, or Firm* — Smith, Gambrell & Russell, LLP (57) ABSTRACT

There are provided a method for controlling communication of a radio terminal with a radio base station at transmission power granted by the radio base station at a request of the radio terminal to the radio base station. The radio terminal, allocates, during communication through an uplink data channel (E-DPDCH) at first transmission power granted by the radio base station, at least part of second transmission power of an uplink control channel (HS-DPCCH) to the uplink data channel (E-DPDCH) by controlling a transmission state of the uplink control channel (HS-DPCCH); and requests the radio base station to increase the first transmission power for the uplink data channel (E-DPDCH) in accordance with the allocating.

12 Claims, 7 Drawing Sheets

(56) References Cited

U.S. PATENT DOCUMENTS

| | | | |
|---|---|---|---|
| 2006/0268773 A1* | 11/2006 | Ranta-aho et al. | 370/329 |
| 2006/0268789 A1* | 11/2006 | Yu et al. | 370/335 |
| 2007/0173279 A1* | 7/2007 | Kuroda et al. | 455/522 |
| 2007/0259681 A1* | 11/2007 | Cheng et al. | 455/522 |
| 2008/0037464 A1* | 2/2008 | Lim et al. | 370/329 |
| 2008/0170504 A1* | 7/2008 | Petrovic et al. | 370/235 |
| 2009/0117933 A1* | 5/2009 | Umesh et al. | 455/522 |
| 2010/0255868 A1* | 10/2010 | Lee et al. | 455/509 |
| 2011/0069737 A1* | 3/2011 | Jalali | 375/130 |

FOREIGN PATENT DOCUMENTS

| | | |
|---|---|---|
| JP | 2005-6293 | 1/2005 |
| JP | 200564872 | 3/2005 |
| JP | 2005514884 | 5/2005 |
| WO | 2006016775 A2 | 2/2006 |
| WO | 2006103099 A1 | 10/2006 |

OTHER PUBLICATIONS

"3GPP TS 25.212 V7.2.0 (Sep. 2006); 3rd Generation Partnership Project; Technical Specification Group Radio Access Network; Multiplexing and channel coding (FDD) (Release 7)".

"3GPP TR 25.808 V6.0.0 (Mar. 2005); 3rd Generation Partnership Project; Technical Specification Group Radio Access Network; FDD Enhanced Uplink; Physical Layer Aspects (Release 6)".

Japanese Notice Ground(s) of Rejection dated May 17, 2011 for application No. 2007-030209.

Extended European Search Report dated Apr. 3, 2012 issued in application No. 07123869.5-2411/1956728.

\* cited by examiner

| "Happy" bit | $x_{h,1}$ |
|---|---|
| Happy | 1 |
| Not happy | 0 |

METHOD FOR CONTROLLING COMMUNICATION OF RADIO TERMINAL, AND RADIO TERMINAL

CROSS REFERENCE TO RELATED APPLICATIONS

This application is based on and hereby claims priority to Japanese Application No. 2007-030209 filed on Feb. 9, 2007 in Japan, the contents of which are hereby incorporated by reference.

BACKGROUND OF THE INVENTION

1. Field of the Invention

The present invention relates to a method for controlling communication of a radio terminal and the radio terminal preferably used in a radio communication system performs communication in, for example, W-CDMA (Wideband-Code Division Multiple Access) method.

2. Description of the Related Art

W-CDMA is one of the radio communication interfaces defined by IMT-2000 (International Mobile Telecommunications-2000) and is regarded as a typical radio communication method.

The maximum transmission rate of 384 kbps of W-CDMA can realize multimedia access for audio, moving image, data and others.

Further, research and development have been recently made for radio communication methods called HSDPA (High Speed Downlink Packet Access) and HSUPA (High Speed Uplink Packet Access) based on the W-CDMA technique.

Comparing with the current W-CDMA, HSDPA is a technique for high-speed downlink packet transmission in the direction from a base station to a UE (User Equipment) and HSUPA is a technique for high-speed uplink packet transmission in the reverse direction. HSDPA and HSUPA have been standardized by 3GPP Release 5 (3rd Generation Partnership Project Release 5), and 3GPP Release 6, respectively.

Figure 2:
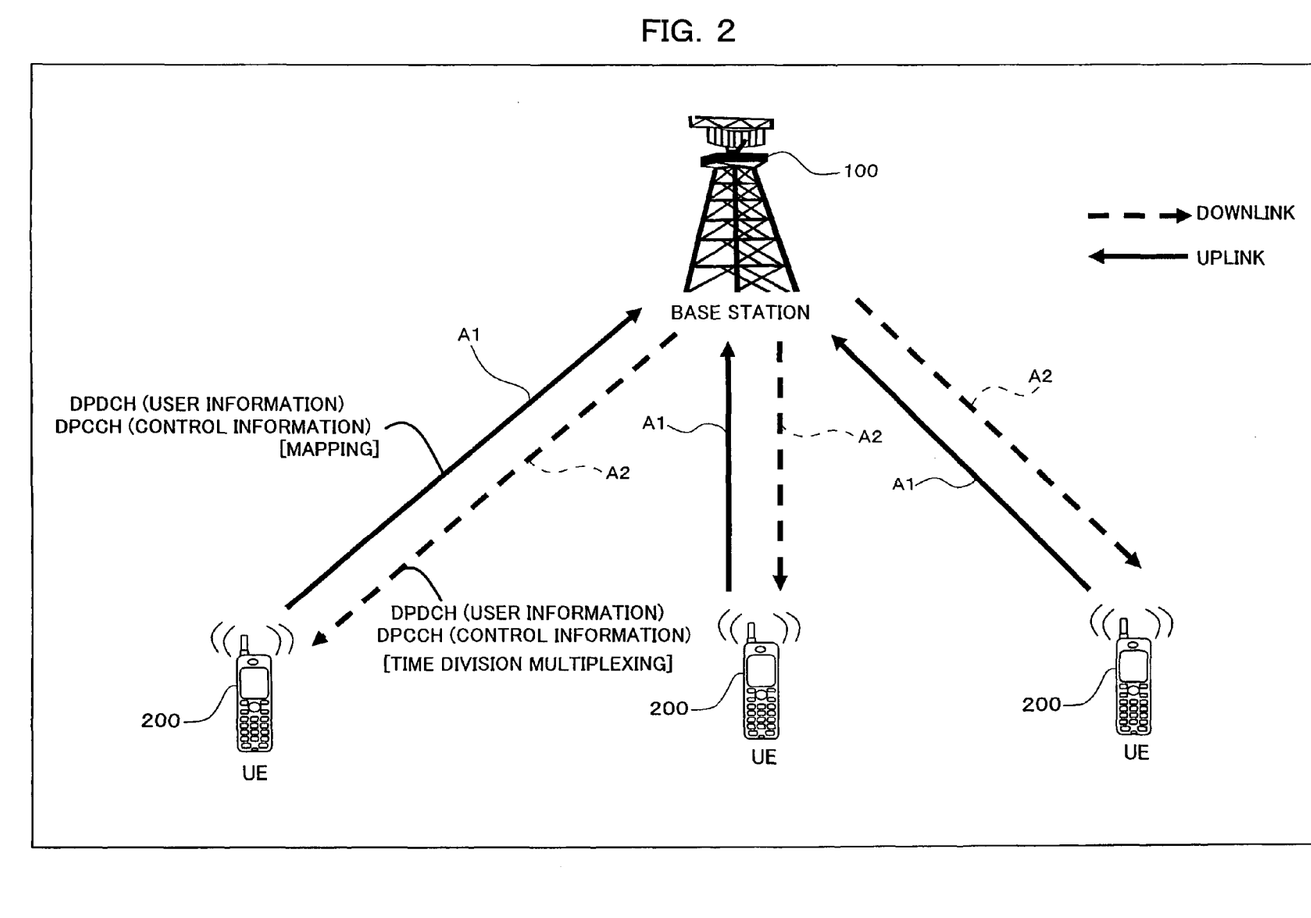
FIG. 2 is a diagram illustrating the concept of W-CDMA communication.

FIG. 2 shows the concept of W-CDMA communication. As shown in FIG. 2, a radio communication in the W-CDMA method is performed between a radio base station 100 and one or more of UEs 200.

In the uplink, DPDCH (Dedicated Physical Data Channel) for transmission of user information, DPCCH (Dedicated Physical Control Channel) for transmission of control information are mapped over the in-phase component (I axis) and the Quadrature component (Q axis) of QPSK (Quadrature Phase Shift Keying) modulation, respectively and are transmitted to the radio base station 100 (see solid arrow A1).

In the downlink, the DPDCH and the DPCCH are time-division-multiplexed and are transmitted to the UE 200 (see broken arrow A2). These downlink channels are dedicated to each UE 200 and transmission through these channels is performed exclusively of the other UEs 200.

Figure 3:
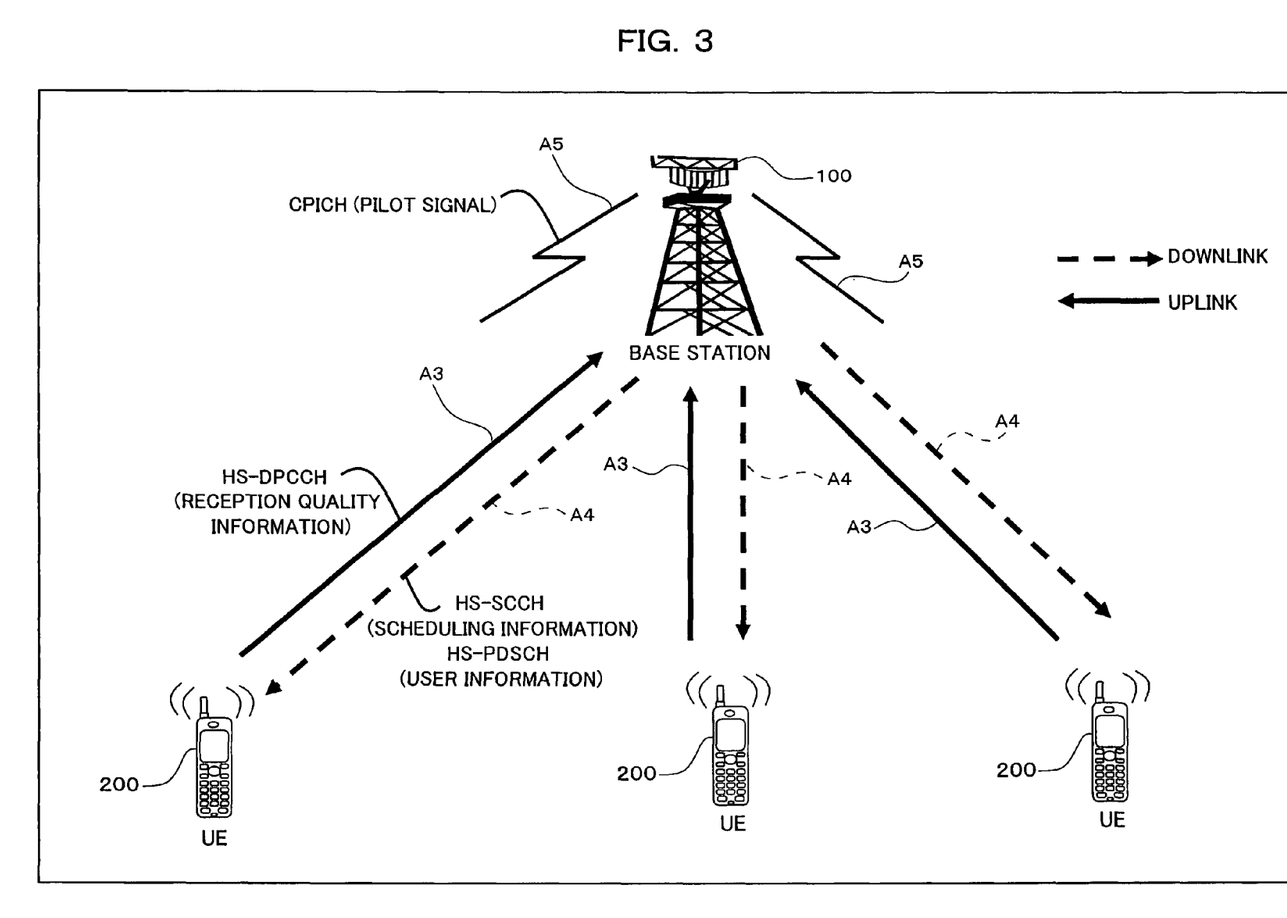
FIG. 3 is a diagram illustrating the concept of HSDPA communication.

Next, FIG. 3 shows the concept of HSDPA communication. As shown in FIG. 3, downlink transmission from the radio base station 100 to the UE 200 is carried out by HSDPA communication.

Specifically, each UE 200 receives a pilot signal (known by radio base station 100 and the UE 200) transmitted through a pilot channel (CPICH: Common Pilot Channel) (see reference number A5). In accordance with the received pilot signal, each UE 200 measures a downlink propagation environment, that is, reception quality (SIR: Signal-to-Interference Ratio), calculates a CQI (Channel Quality Indicator) representing downlink reception quality based on the measured SIR, and notifies the radio base station 100 of the calculated CQI through HS-DPCCH (High Speed Dedicated Physical Control Channel) (see solid arrow A3).

Considering the downlink reception quality information (CQI) notified by UEs 200, the radio base station 100 schedules preferential selection of a predetermined number of UEs in a good propagation environment. If a certain UE 200 is selected by the scheduling, the radio base station 100 transmits scheduling information (including the modulation method, the transmission amount, and others) to the UE 200 through HS-SCCH (High Speed Shared Control Channel) (see broken arrow A4). The UE 200 determines the functions of the UE 200 itself with reference to the received scheduling information.

After that, the radio base station 100 transmits user information to the UE 200 through a radio channel called HS-PDSCH (High Speed Physical Downlink Shared Control Channel) (see broken arrow A4). The HS-PDSCH for transmission of user information is commonly used by all UEs 200, and a single time slot generated by time division is shared by one or more UEs 200 to realize downlink access of 14.4 Mbps at maximum.

Figure 4:
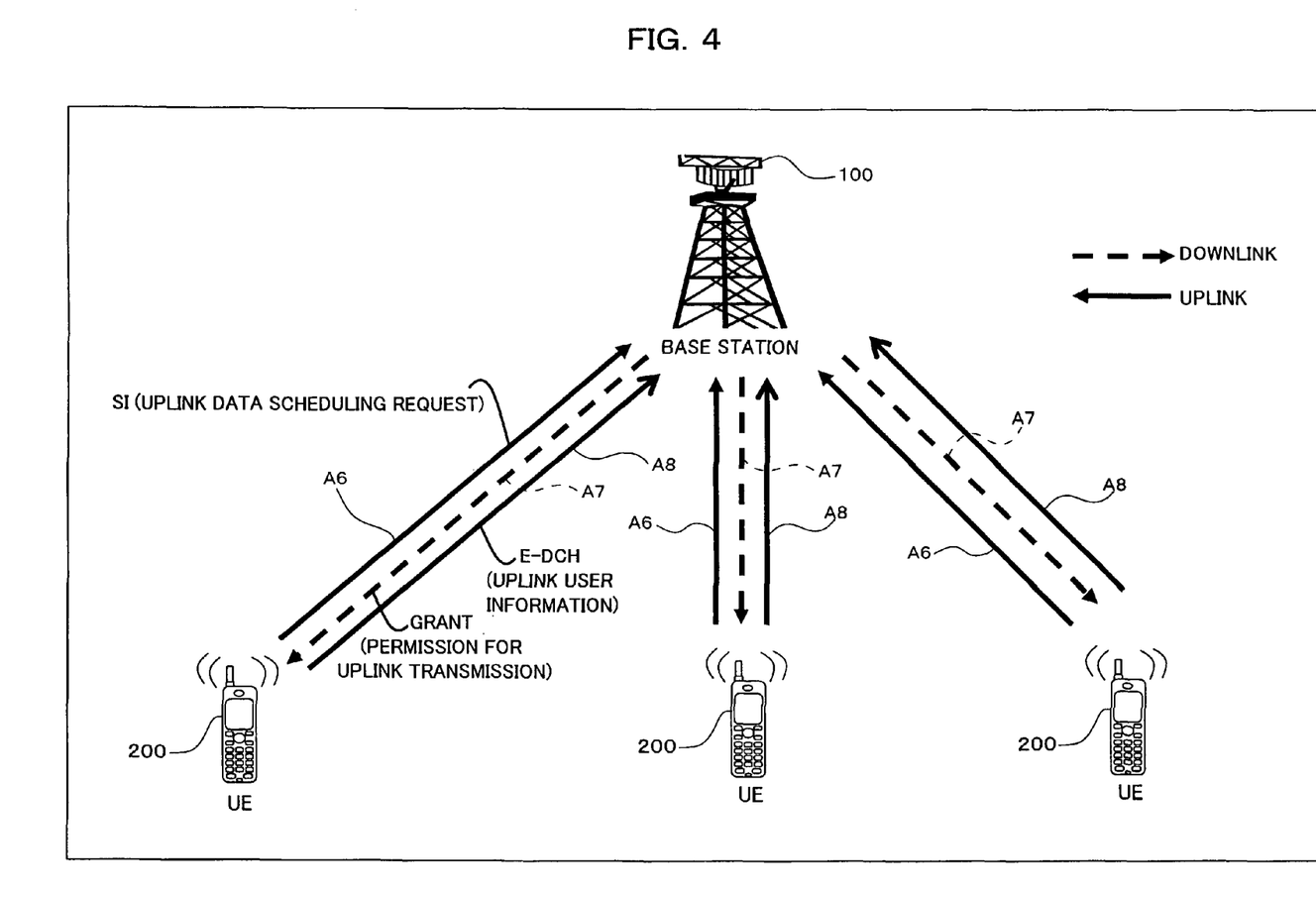
FIG. 4 is a diagram illustrating the concept of HSUPA communication.

FIG. 4 shows the concept of HSUPA communication. As shown in FIG. 4, uplink transmission from the UE 200 to the radio base station 100 is performed by communication HSUPA.

In other words, the UE 200 sends the radio base station 100 SI (Scheduling Information) as a request for uplink data transmission (see solid arrow A6).

The radio base station 100 collects a number of pieces of SI sent from UEs 200, schedules transmission timings for uplink transmission of UEs 200 based on communication quality of each UE 200, data priority and other factors, and finally transmits "Grant" indicating uplink transmission permission to UEs 200 (see broken arrow A7). "Grant" is classified into two types of "absolute Grant" and "relative Grant": "absolute Grant" is used to notify an uplink transmission rate and others at regular intervals and "relative Grant" is used to notify update information of contents notified in the "absolute Grant".

UEs 200 transmit user information to the radio base station 100 through channels called E-DCH (Enhanced Dedicated Channel), dedicated one to each UE 200, in order of being permitted transmission in the form of receipt of "Grant" from the radio base station 100 (see solid arrow A8) whereby high-speed uplink access is made possible. The transmission rate through an E-DCH is being examined to be approximately 2-5 Mpbs.

HSDPA adopts an adaptive coding and modulation method, and is characterized by, for example, switching a modulation method between QPSK modulation and 16 QAM modulation according to a radio environment between the radio base station 100 and the UE 200. In order to realize communication in the adaptive coding modulation method, the UE 200 defines the CQI to report the reception environment to the radio base station 100 and a CQI table defines formats different in transmission power which formats vary with the value of the CQI in the range of, for example, from 1 through 30.

Then the UE 200 measures the reception environment, and if it is assumed that the UE 200 receives data through the HS-PDSCH within 3 slots from the immediately before the slot of transmission of CQI under the measured environment, reports a CQI which is the maximum among CQIs not exceeding the BLER (Block Error Rate)=0.1 of the HS-PDSCH or which is less than the maximum CQI to the radio base station 100.

In the meanwhile, in HSUPA, the radio base station 100 monitors the total uplink interference amount (reception power) of controlling UEs 200, and as a result of comparison between the reception power and a threshold, indicates the absolute value of transmission rate using E-AGCH (a command indicating the absolute value of the maximum rate) or indicates increase, holding, or decrease in the transmission power using E-RGCH (a command indicating a relative value of the maximum rate). The UE 200 if having uplink transmission data transmits SI (a scheduling request) to the radio base station 100.

SI indicates information concerning transmission data that the UE 200 is to transmit which information is exemplified by "highest priority logical channel ID", "total data amount of all the logical channel", "total data amount of highest priority logical channel", and "a transmission power that a UE 200 can transmit" that are mapped on the SI.

Figure 6:
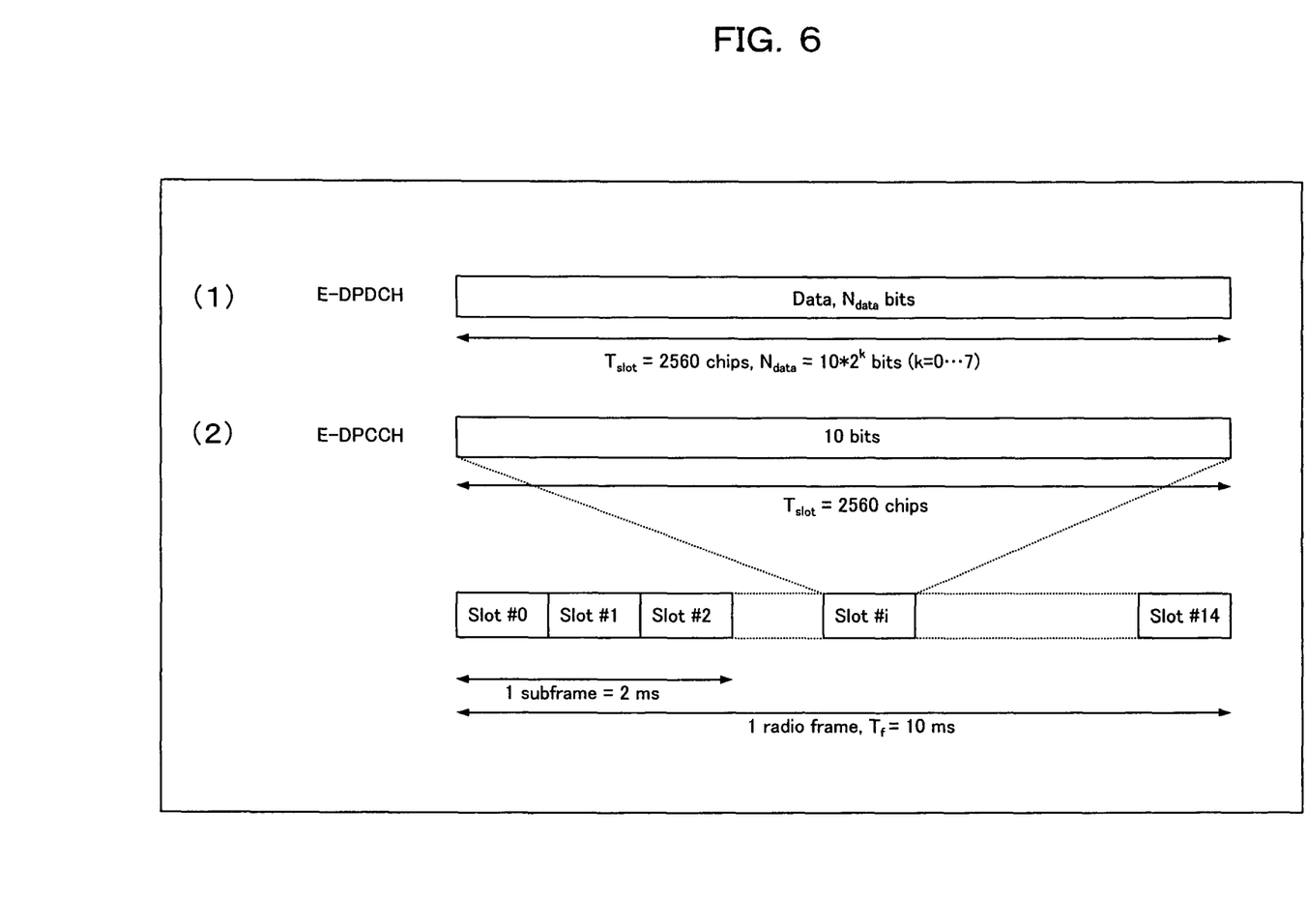
FIG. 6 is a diagram illustrating frame formats for E-DPCCH and E-DPDCH.

FIG. 6 shows frame formats of E-DPDCH (Enhanced-Dedicated Physical Control Channel) and the E-DPDCH (Enhanced-Dedicated Physical Data Channel) that are dedicated to the E-DCH. As shown in FIG. 6, the E-DCH is formed by two channels of: (1) E-DPCCH for transmission of control information and (2) E-DPDCH for transmission of data. The E-DPCCH maps control information (uplink control data) for uplink data such as an E-TFCI (E-DCH Transport Format Combination Indicator), an RSN (Retransmission Sequence Number) and a Happy bit, thereover. Here, the E-TFCI is information indicating that an uplink radio frame to be transmitted along with the uplink data is mapped over a transport channel, and the RSN is information indicating the number of uplink HARQs (Hybrid Automatic Repeat Requests) transmitted. Further, the Happy bit is information indicating whether or not the UE 200 requires additional resource (transmission power resource).

Following Patent Reference 1 discloses reduction in a bit number of scheduling information improves the efficiency of communication. Following Non-Patent Reference 1 serves as an exemplary material about a physical channel and a transport channel for W-CDMA including HSUPA. Following Non-Patent References 2 and 3 serve as exemplary materials about a physical layer of HSUPA.

[Patent Reference 1] Japanese Patent Application Laid-Open (KOKAI) No. 2005-6293
[Non-Patent Reference 1] 3GPP TS 25.211 Release 7 (V7.0.0) (2006-03)
[Non-Patent Reference 2] 3GPP TS 25.212 Release 7 (V7.2.0) (2006-09)
[Non-Patent Reference 3] 3GPP TR 25.808 Release 6 (V6.0.0) (2005-03)

Figure 5:
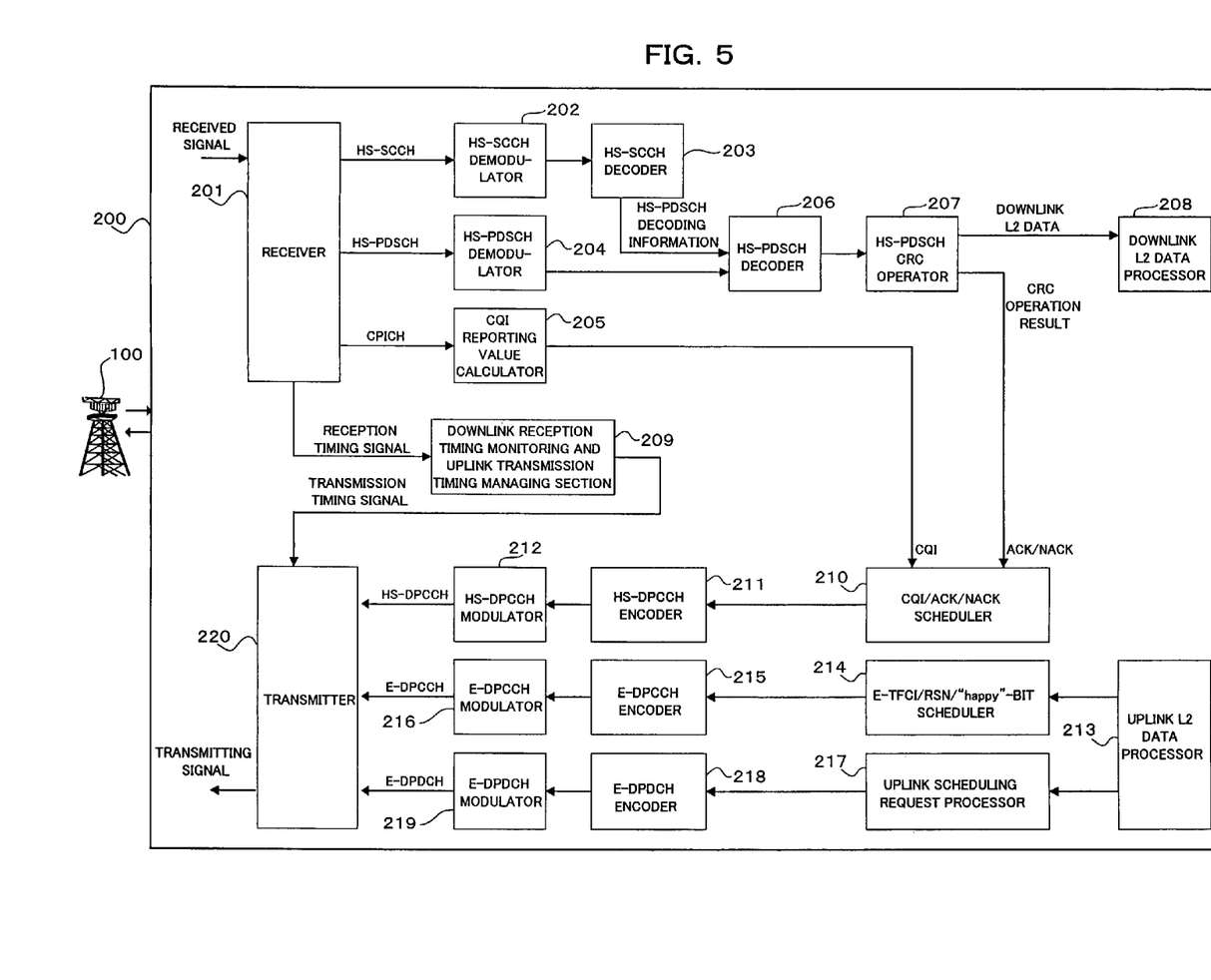
FIG. 5 is a block diagram schematically illustrating a UE with a function of transmitting an SI (scheduling information) in HSUPA communication.

In succession, FIG. 5 shows elements of the UE 200 having a function for transmitting the SI (scheduling request) UE 200 shown in FIG. 5 includes, for example, a receiver 201, an HS-SCCH demodulator 202, an HS-SCCH decoder 203, an HS-PDSCH demodulator 204, a CQI reporting value calculator 205, an HS-PDSCH decoder 206, an HS-PDSCH CRC operator 207, a downlink L2 (Layer 2) data processor 208, a downlink reception timing monitoring and uplink transmission timing managing section 209, a CQI/ACK/NACK scheduler 210, an HS-DPCCH encoder 211, an HS-DPCCH modulator 212, an uplink L2 (Layer 2) data processor 213, an E-TFCI/RSN/Happy-bit scheduler 214, an E-DPCCH encoder 215, an E-DPCCH modulator 216, an uplink scheduling request processor 217, an E-DPDCH encoder 218, an E-DPDCH modulator 219, and a transmitter 220.

In the UE 200 having the above-described elements and parts, a signal received at a reception antenna (not shown) is inputted into the receiver 201, where a path detection and an inverse diffusion process are performed to separate the CPICH, the HS-SCCH and the HS-PDSCH from one another.

The CPICH (a pilot signal) obtained by the separation is inputted into the CQI reporting value calculator 205 to be used for calculating a CQI reporting value. In other words, a downlink reception SIR is measured in accordance with the received pilot signal and a downlink CQI is calculated considering the result of the measurement. The calculated CQI is subjected to an encoding process, a modulation process, and a radio transmission process while passing the CQI/ACK/NACK scheduler (hereinafter also simply called "scheduler") 210, the HS-DPCCH encoder 211, the HS-DPCCH modulator 212, and the transmitter 220, and is then transmitted to the radio base station 100 through the HS-DPCCH. The obtained pilot signal is also used to calculate channel estimation values of the HS-SCCH and the HS-PDSCH.

The HS-SCCH separated in the receiver 201 undergoes a channel compensation using the channel estimation value obtained on the basis of the received pilot signal and then a demodulation in the HS-SCCH demodulator 202, and is decoded in the HS-SCCH decoder 203. The result of the decoding includes information (e.g., an encoding method, an encoding ratio) required to decode the HS-PDSCH and is therefore inputted into the HS-PDSCH demodulator 206.

The HS-PDSCH separated by receiver 201, which has been subjected to a channel compensation using the channel estimation value and demodulation in HS-PDSCH demodulator 204, is decoded in HS-PDSCH decoder 206 using the result of decoding from HS-SCCH decoder 203 and is used for a CRC operation in HS-PDSCH CRC operator 207 for error check.

The decoded data that has been judged to have no error (CRC operation result of which is OK) is regarded as received data of the downlink layer 2 and is therefore inputted into the downlink L2 data processor 208, where a predetermined data processing is performed on the decoded data.

The result of the CRC operation is inputted into the scheduler 210, which schedules, along with the CQI reporting value, reception result information of ACK (Acknowledgment) or NACK (Negative Acknowledgment) respectively corresponding to the CRC-operation result being OK or NG. The CRC-operation result is then subjected to an encoding process, a modulating process and a radio transmission process while passing the HS-DPCCH encoder 211, the HS-DPCCH modulator 212, and the transmitter 220, and is finally notified to the radio base station 100 through the HS-DPCCH.

In the meanwhile, concerning the uplink, if data that is to be transmitted to the radio base station 100 is present at the uplink L2 data processor 213, the E-TFCI/RSN/Happy bit scheduler 214 generates uplink control data, which undergoes an encoding process, a modulation process and a radio transmission process while passing the E-DPCCH encoder 215, the E-DPCCH modulator 216, and the transmitter 220 and is transmitted to the radio base station 100 through the E-DPCCH. Further, the uplink scheduling request processor 217 generates uplink SI, on which an encoding process and a modulating process and a radio transmission process are performed in the E-DPDCH encoder 218, the E-DPDCH modulator 219, and the transmitter 220 and which is consequently transmitted to the radio base station 100 through the E-DPDCH.

The transmission timings of the HS-DPCCH, the E-DPCCH, and the E-DPDCH from the transmitter 220 are managed in accordance with a transmission timing signal from the downlink reception timing monitoring and uplink transmission timing managing section 209 (hereinafter simply called "timing management section"). In other words, the timing management section 209 manages transmission timings (transmission slots) of the HS-DPCCH, the E-DPCCH, and the E-DPDCH with reference to reception timings (frame timings) specified by a frame synchronization process performed in the receiver 201, and controls the transmission timing of the transmitter 220 to be a predetermined timing in accordance with the transmission timing in question.

Figure 7:
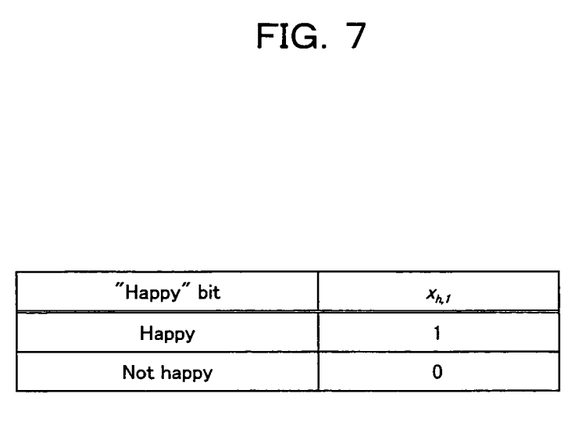
FIG. 7 is a diagram illustrating values of a happy bit.

FIG. 7 is a diagram illustrating a digit of the Happy bit. As shown in FIG. 7, the Happy bit transmitted through the E-DPCCH indicates either the "Happy state" (Happy bit of "1") in which the UE 200 does not require an additional resource or the "Unhappy state" (Happy bit of "0") in which the UE 200 requires an additional resource. If all the three following conditions are satisfied, the "Not happy (Unhappy) state" representing a requirement for an additional resource is notified to the radio base station 100.

(1) UE is transmitting schedule data of the maximum amount permitted under the current SI.

(2) UE can use sufficient power that allows transmission at a higher data rate.

(3) A transmission delay of the uplink data is a predetermined value or more, so that transmission of the uplink data accumulated in the buffer of the UE cannot be completed within the predetermined time limit.

Accordingly, for example, if the communication environment (communication quality) between the radio base station 100 and the UE 200 does not satisfy a certain level while the UE 200 nevertheless transmits uplink data to the radio base station through the E-DPDCH at the maximum transmission power, a lack of an uplink transmission rate may fail in completion of transmitting of all uplink data. But the above case dissatisfies the condition (2) that "UE can use sufficient power that allows transmission at a higher data rate." As a result, the UE 200 notifies the radio base station 100 of the "Happy state" indicating not requiring the additional resource, and cannot request the radio base station 100 for allocation of the additional resource. That may cause a problem that transmission of uplink data cannot be normally completed.

SUMMARY OF THE INVENTION

The one of objects of the present invention is to transmit uplink data from a radio terminal to a radio base station at transmission power higher than that granted by the radio base station.

To attain the above object, the present invention provides a method for controlling communication of a radio terminal and a radio terminal as follows:

(1) There is provided as a first generic feature a method for controlling communication of a radio terminal with a radio base station at transmission power granted by the radio base station at a request of the radio terminal to the base station, comprising the steps of: in the radio terminal, during communication through an uplink data channel at first transmission power granted by the radio base station, allocating at least part of second transmission power of an uplink control channel to the uplink data channel by controlling a transmission state of the uplink control channel; and requesting the radio base station to increase the first transmission power for the uplink data channel in accordance with the allocating.

(2) Here, the radio terminal may obtain part of the first transmission power that is to be allocated to the uplink data channel by controlling a transmission state of a transmission period of the uplink control channel to be a discontinuous transmission state so that the second transmission power of the uplink control channel is saved.

(3) The transmission period may have originally been reserved for transmitting a reception result of data received through a downlink data channel from the radio base station.

(4) The transmission period may have originally been reserved for transmitting reception quality information to the radio base station.

(5) There is provide as a second generic feature a radio terminal for communicating with a radio base station at transmission power granted by the radio base station responsive at a request of the radio terminal to the base station, comprising: transmission power controlling means for controlling, during communication through an uplink data channel at first transmission power granted by the radio base station, a transmission state of an uplink control channel and allocating at least part of second transmission power of the uplink control channel to the uplink data channel; and transmission power increase requesting means for requesting the radio station to increase the first transmission power for the uplink data channel in accordance with the allocating by the transmission power controlling means.

The present invention can provide the following advantages selectively or in combination.

(1) Since the radio terminal of the present invention controls, during communication through an uplink data channel at first transmission power granted by the radio base station, a transmission state of an uplink control channel, allocates at least part of second transmission power of the uplink control channel to the uplink data channel and requests the radio station to increase the first transmission power for the uplink data channel in accordance with the allocating, it is possible to use higher transmission power for transmission through the uplink data channel so that high-speed transmission through the uplink data channel can be realized.

(2) Here, since the radio terminal obtains part of the first transmission power that is to be allocated to the uplink data channel by controlling a transmission state of a transmission period of the uplink control channel to be a discontinuous transmission state so that the second transmission power of the uplink control channel is saved, the first transmission power of the uplink data channel can be increased with ease.

(3) If information indicating an abnormal reception of the data is to be transmitted using the transmission period, transmission through the uplink data channel can be at a higher speed without impairing the throughput in the downlink direction from the radio base station to the radio terminal.

(4) Further, if information indicating an abnormal reception of the data is to be transmitted using the transmission period, transmission through the uplink data channel can be at a higher speed without requiring changing in communication method from the radio base station to the radio terminal.

Other objects and further features of the present invention will be apparent from the following detailed description when read in conjunction with the accompanying drawings.

DESCRIPTION OF THE PREFERRED EMBODIMENTS

A referred embodiment of the present invention will now be described with reference to the accompanying drawings. The present invention should by no means be limited to the following embodiment and various changes and modifications can be suggested without departing the concept of the present invention.

(a) First Embodiment

Figure 1:
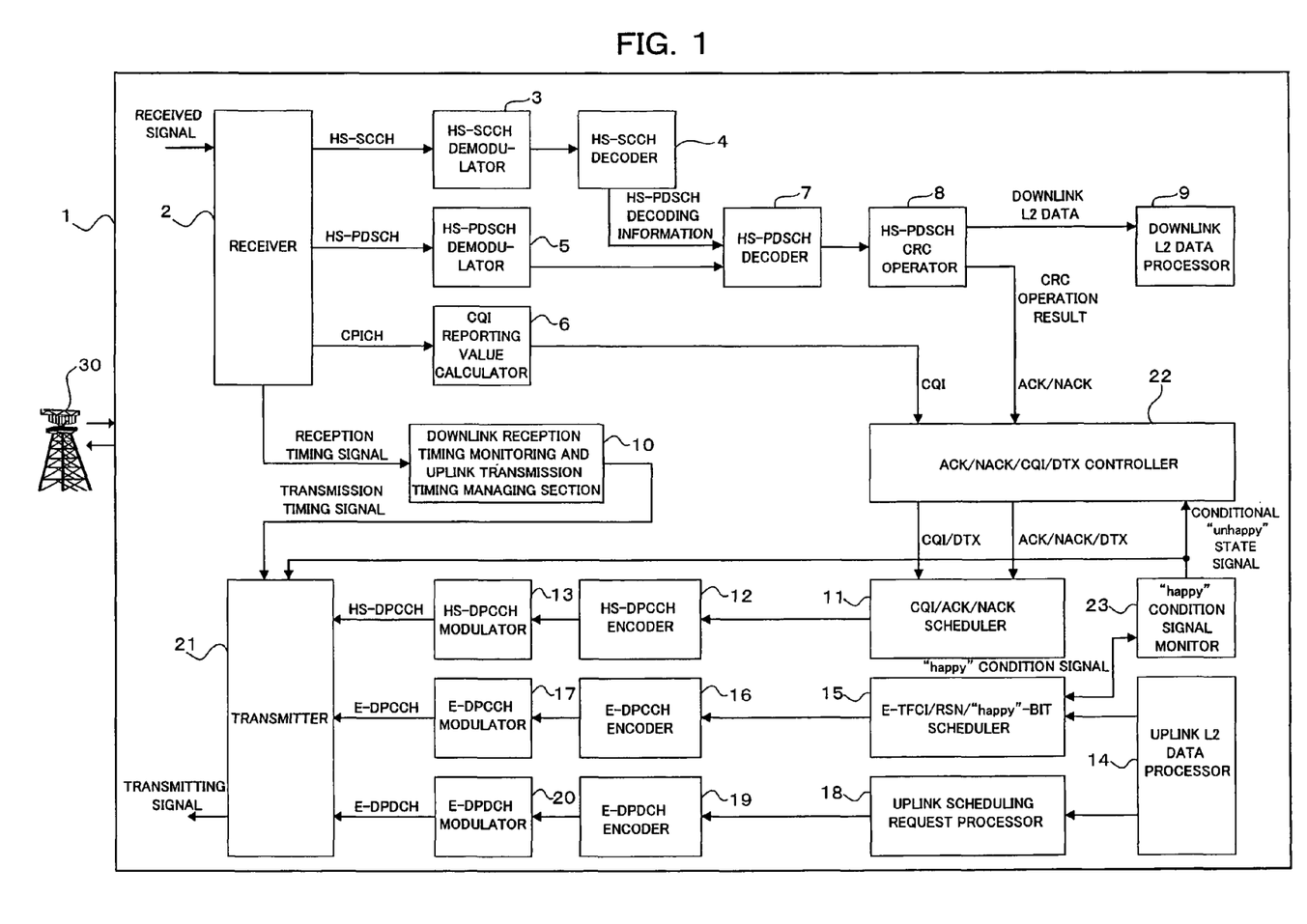
FIG. 1 is a block diagram schematically illustrating a UE (User Equipment) according to a first embodiment of the present invention.

FIG. 1 is a block diagram schematically illustrating a radio terminal (UE) according to the first embodiment of the present invention. UE 1 shown in FIG. 1 includes, for example, a receiver 2, an HS-SCCH demodulator 3, an HS-SCCH decoder 4, an HS-PDSCH demodulator 5, a CQI reporting value calculator 6, an HS-PDSCH decoder 7, an HS-PDSCH CRC operator 8, a downlink L2 (Layer 2) data processor 9, a downlink reception timing monitoring and uplink transmission timing managing section 10, a CQI/ACK/NACK scheduler 11, an HS-DPCCH encoder 12, an HS-DPCCH modulator 13, an uplink L2 (Layer 2) data processor 14, an E-TFCI/RSN/Happy-bit scheduler 15, an E-DPCCH encoder 16, an E-DPCCH modulator 17, an uplink scheduling request processor 18, an E-DPDCH encoder 19, an E-DPDCH modulator 20, a transmitter 21, an ACK/NACK/CQI/DTX controller 22, and a Happy condition signal monitor 23.

In other words, the UE 1 communicates with a radio base station 30 at transmission power granted by the radio base station 30 at a request (of the UE 1) to the radio base station 30, and includes new elements of the ACK/NACK/CQI/DTX controller 22 and the Happy condition signal monitor 23 in addition to the elements incorporated in a conventional radio terminal.

Here, the receiver 2 performs a path detection and an inverse diffusion process responsive to receipt of a signal at a reception antenna (not shown) and separates channels of the CPICH, the HS-SCCH and the HS-PDSCH from one another.

The CQI reporting value calculator 6 calculate a CQI reporting value based on the CPICH (pilot signal) separated by the receiver 2, and more specifically measures a downlink reception SIR based on the received pilot signal and calculates a downlink CQI based on the result of the measurement.

A CQI calculated by the CQI reporting value calculator 6 is subjected to an encoding process, a modulation process, and a radio transmission process while passing the CQI/ACK/NACK scheduler (hereinafter also simply called "scheduler") 11, the HS-DPCCH encoder 12, the HS-DPCCH modulator 13, and the transmitter 21, and is then transmitted to the radio base station 30 through the HS-DPCCH. The received pilot signal is also used to calculate channel estimation values of the HS-SCCH and the HS-PDSCH.

The HS-SCCH demodulator 3 performs a channel compensation using a channel estimation value obtained in accordance with the received pilot signal on the HS-SCCH separated by the receiver 2 and then demodulates the compensated HS-SCCH. The HS-SCCH decoder 4 decodes the HS-SCCH from the HS-SCCH demodulator 3. The result of decoding in the HS-SCCH decoder 4 includes information (e.g., an encoding method, an encoding ratio) required to decode the HS-PDSCH and is therefore inputted into the HS-PDSCH demodulator 5.

The HS-PDSCH demodulator 5 demodulates the HS-PDSCH which has been separated in the receiver 2 and which has undergone a channel compensation using a channel estimating value. The HS-PDSCH decoder 7 decodes the received HS-PDSCH using the result of the decoding in the HS-SCCH decoder 4.

The HS-PDSCH CRC operator 8 has a function to perform a CRC operation on the result of the decoding in the HS-PDSCH decoder 7 for error check.

The downlink L2 data processor 9 performs a predetermined L2-data process on decoded data that the error check by the HS-PDSCH CRC operator 8 has judged to have no error (CRC operation result of which is OK). The reception result information (i.e., an ACK or a NACK) serving as the CRC operation result is inputted into the ACK/NACK/CQI/DTX controller 22.

The scheduler 11 schedules transmission processes for various information pieces of an ACK, a NACK, and a CQI reporting value, which are subsequently inputted into the HS-DPCCH encoder 12 where a predetermined transmission process takes place.

For this purpose, the HS-DPCCH encoder 12 has a function for performing a predetermined encoding process on the information pieces, and the HS-DPCCH modulator 13 has a function for performing a predetermined modulating process on the same information pieces. Further, the transmitter 21 carries out a predetermined radio transmission process.

In other words, information output from the ACK/NACK/CQI/DTX controller 22 is notified to the radio base station 30 via the scheduler 11, the HS-DPCCH encoder 12, the HS-DPCCH modulator 13, and the transmitter 21.

In the meanwhile, uplink transmission data (uplink data) is generated in the uplink L2 data processor 14. The uplink L2 data processor 14 has a function for performing a predetermined L2 process as well as a function for generating uplink L2 data that is to be transmitted to the radio base station 30.

The E-TFCI/RSN/Happy-bit scheduler 15 generates control information (uplink control data) for uplink data when the uplink L2 data processor 14 generates uplink L2 data to be transmitted to the radio base station 30. Information such as E-TFCI, RSN, and a Happy bit is mapped over the uplink control data.

The E-DPCCH encoder 16 encodes the uplink control data in a predetermined encoding manner. The E-DPCCH modulator 17 modulates the uplink control data in a predetermined modulating manner, and the transmitter 21 radio transmits the uplink control data in a predetermined transmission manner. In other words, the uplink control data undergoes an encoding process, a modulating process and a transmission process while passing the E-DPCCH encoder 16, the E-DPCCH modulator 17, and the transmitter 21, and is then transmitted to the radio base station 30 through the E-DPCCH.

Here, the Happy bit is defined so as to be zero ("0") indicating the "Not Happy (Unhappy)" state, in which more resource is required, if all the below conditions (1) to (3) are satisfied.

(1) UE 1 is transmitting uplink data of the maximum amount permitted under the current SI.

(2) UE 1 can use sufficient power that allows UE 1 to transmit uplink data at a higher data rate.

(3) A transmission delay of the uplink data is a predetermined value or more, so that the uplink data accumulated in the buffer (not shown) of the UE 1 cannot be transmitted to the radio base station 30 within the predetermined time limit.

The above conditions (1) to (3) are defined in the HSUPA beforehand.

In the UE 1 of the first embodiment, the E-TFCI/RSN/Happy-bit scheduler 15 judges as to whether or not each of the conditions (1) to (3) is satisfied with reference to control information of various element in the UE 1 and information obtained from the transmission buffer.

The uplink scheduling request processor 18 generates uplink SI, and the E-DPDCH encoder 19 performs a predetermined encoding process on the uplink SI generated in the uplink scheduling request processor 18.

Further, the E-DPDCH modulator 20 performs a predetermined modulation process on the uplink SI encoded by the E-DPDCH encoder 19. In order words, the uplink SI generated by the uplink scheduling request processor 18 undergoes an encoding process, a modulating process, and a transmission process while passing the E-DPDCH encoder 19, the E-DPDCH modulator 20, and the transmitter 21, and is then transmitted to the radio base station 30 through the E-PDPCH.

Upon receipt of the uplink SI, the radio base station 30 totals a number of SI blocks from UEs 1, schedules transmission timings of uplink transmission from UEs 1 considering quality of communication with each UE, data priority and others and transmits "Grant" indicating transmission permission to UEs 1. UEs 1 received "Grant" from the radio base station 30 transmit uplink data through the E-DPDCHs to the radio base station 30 in order of uplink transmission permission in the form of reception of "Grant".

The downlink reception timing monitoring and uplink transmission timing managing section (hereinafter simply called "timing management section") 10 generates a transmission timing signal which controls a transmission timing of the transmitter 21 through the HS-DPCCH, the E-DPCCH, and the E-DPDCH. In other words, on the basis of a reception timing (frame timing) specified through a frame synchronization process performed in the receiver 2, the timing management section 10 manages transmission timings (transmitting slots) through the HS-DPCCH, the E-DPCCH, and the E-DPDCH, and controls transmission timings of the transmitter 21, in accordance with the above transmission timing, to coincide with a predefined timing.

The ACK/NACK/CQI/DTX controller 22 receives a "conditional Unhappy state signal" described below from the Happy condition signal monitor 23 and then controls the scheduler 11 to map no data over a transmission period for a CQI reporting value and a NACK of the HS-DPCCH in accordance with the CQI reporting value, the ACK, and the NACK so that the transmission period is in a DTX (Discontinuous Transmission) state. Hereinafter, such a control is simply referred to as "mapping DTX".

In the first embodiment, when a CQI reporting value for a certain communication process indicating identical or better reception quality than the preceding CQI reporting value transmitted is transmitted to the radio base station 30 responsive to the receipt of a "conditional Unhappy state signal", the ACK/NACK/CQI/DTX controller 22 controls the scheduler 11 to map DTX as a substitution for a CQI reporting value over the HS-DPCCH. Similarly, when an NACK is to be transmitted as a response signal indicating abnormal reception in a certain communication process, the ACK/NACK/CQI/DTX controller 22 controls the scheduler 11 to map DTX as a substitution for the NACK over the HS-DPCCH.

The Happy condition signal monitor 23 monitors the state of each of the conditions (above conditions (1) to (3)) concerning a "Happy bit" generated in the E-TFCI/RSN/Happy bit scheduler 15, and has a function for outputting a "conditional Unhappy state signal" to the ACK/NACK/CQI/DTX controller 22 and the transmitter 21 if only the above condition (2) (i.e., UE 1 can use sufficient power that allows UE 1 to transmit uplink data at a higher data rate) is not satisfied in the first embodiment.

In addition, the Happy condition signal monitor 23 has a function for judging whether or not transmission of DTX instead of a CQI reporting value or a NACK in the ACK/NACK/CQI/DTX controller 22 saves transmission power which makes it possible to transmit uplink data at a higher data rate.

That is, in the present first embodiment, the Happy condition signal monitor 23 in the UE 1 judges whether or not use of transmission power that can be saved by the ACK/NACK/CQI/DTX controller 22 can transmit uplink data at higher data rate, and if the result of the judgment is positive, controls the E-TFCI/RSN/Happy-bit scheduler 15 to map an "Unhappy state" over the Happy bit.

After that, if the radio base station 30 permits the maximum transmission power to increase, that is, permits UE 1 allocation of additional transmission power resource, the Happy condition signal monitor 23 notifies the ACK/NACK/CQI/DTX controller 22 and the Happy condition signal monitor 23 of a "conditional Unhappy state signal."

Upon receipt of the "conditional Unhappy state signal," the ACK/NACK/CQI/DTX controller 22 saves the transmission power resource by mapping DTX as substitution for the CQI reporting value and the NACK that are to be originally transmitted. The transmitter 21 having received the same "conditional Unhappy state signal" allocates a transmission power resource generated by the saving to uplink transmission data to increase the transmission power through the E-DPDCH, so that uplink data can be transmitted to the radio base station 30 at a higher data rate.

In other words, during communication to the radio base station 30 through the E-DPDCH at transmission power granted by the radio base station 30, the ACK/NACK/CQI/DTX controller 22, the Happy condition signal monitor 23 and the transmitter 21 function as transmission power controlling means for controlling a transmission state of the HS-DPCCH that is the control channel for transmission to the radio base station 30 and allocating at least part of the transmission power of the HS-DPCCH to the data channel E-DPDCH.

The Happy condition signal monitor 23, the E-TFCI/RSN/Happy-bit scheduler 15, the E-DPCCH encoder E-DPCCH encoder 16, the E-DPCCH modulator 17, and the transmitter 21 function as transmission power increase requesting means for controlling the Happy bit to be the "Unhappy state" and transmits the Happy bit in order to request the radio base station 30 for increase in transmission power which the radio base station 30 has granted for the HS-DPDCH.

Since the radio base station 30 generally retransmits preceding downlink data transmitted to UE 1 responsive to receipt of DTX from UE 1, the receipt of DTX consequently causes the radio base station 30 to perform the same retransmission process as performed responsive to receipt of NACK. For this reason, controlling the transmission period of NACK to be in a DTX state does not signify.

Further, if the radio base station 30 receives a CQI reporting value in the form of DTX from UE 1, a format of downlink data is determined considering the preceding CQI reporting value receipt during the communication process so that the downlink data is transmitted in the same format as that of the preceding transmission. This process does not decrease the throughput of the downlink communication because the downlink format is not changed.

In the first embodiment, UE 1 transmitting data through the uplink data channel (the E-DPDCH) to the radio base station 30 at a transmission power granted by the radio base station 30 controls a transmission state of the uplink control channel (HS-DPCCH) to the radio base station 30 to allocate at least part of the transmission power of the uplink control channel to the uplink data channel and requests the radio base station 30 to increase the transmission power granted for the uplink data channel in accordance with the allocation. This configuration enables UE 1 of the first embodiment to using larger transmission power of transmission through the uplink data channel whereby transmission through the uplink data channel can be carried out at a higher data rate.

Specifically, when only a condition that "(2) UE 1 can use sufficient power that allows UE 1 to transmit uplink data at a higher data rate" is not satisfied among the three conditions for a Happy bit, UE 1 saves transmission power by mapping DTX as a substitution for a CQI reporting value or a NACK to request the radio base station 30 for additional transmission power resource. In addition, UE 1 transmits a Happy bit indicating an "Unhappy state" as a substitution for that indicating a "Happy state" and thereby receives an allocation of additional transmission power granted by the radio base station 30, and allocates at least part of the saved transmission power to transmission power of the data channel.

Through the above series of the procedure, UE 1 can use additional transmission power to transmit uplink transmission data to the radio base station 30 even if the communication environment (communication quality) between the radio base station 30 and UE 1 is poor to cause a lack of an uplink data rate which results that transmission of all the uplink transmission data cannot be completed. Here, other unspecified operations of UE 1 are similar to known one.

A first embodiment has been detailed as above, but the present invention should by no means be limited to the foregoing first embodiment. Various changes or modifications may be suggested without departing from the gist of the invention.

For example, UE 1 may save the transmission power granted for an uplink control channel other than the HS-DPCCH and may allocate at least part of the saved transmission power to the transmission power of an uplink data channel other than the E-DPDCH.

In the above first embodiment, the transmission power of an uplink control channel is saved by controlling the transmission period for a CQI reporting value or a NACK to be in the DTX state. Alternatively, transmission power may be saved by controlling another period to be in the DTX state.

What is claimed is:

1. A method for controlling communication of a radio terminal with a radio base station at transmission power granted by the radio base station at a request of the radio terminal to the radio base station, the method comprising:
   in the radio terminal,
      during communication through an uplink data channel at a first data rate from the radio terminal to the radio base station using first transmission power granted by the radio base station,
      making transmission power higher than the first transmission power available for transmission through the uplink data channel at a second data rate higher than the first data rate by reducing transmission power to be used for transmission through the uplink control channel, which is different from the uplink data channel, from the radio terminal to the radio base station; and
      requesting the radio base station to grant transmission power higher than the first transmission power for the uplink data channel.

2. A method for controlling communication of a radio terminal according to claim 1, wherein the transmission power to be used for transmission through the uplink control channel is reduced by controlling a transmission state of a transmission period of the uplink control channel to be a discontinuous transmission state.

3. A method for controlling communication of a radio terminal according to claim 2, wherein the transmission period has originally been reserved for transmitting a reception result of data received through a downlink data channel from the radio base station.

4. A method for controlling communication of a radio terminal according to claim 3, wherein the radio terminal controls the transmission state of the transmission period to be in the discontinuous transmission state if an abnormal reception of the data at the transmission period is to be transmitted.

5. A method for controlling communication of a radio terminal according to claim 2, wherein the transmission period has originally been reserved for transmitting reception quality information to the radio base station.

6. A method for controlling communication of a radio terminal according to claim 5, wherein the radio terminal controls the transmission period to be in the discontinuous transmission state if reception quality information indicating identical or better reception quality than preceding quality information transmitted to the radio base station is to be transmitted.

7. A radio terminal for communicating with a radio base station at transmission power granted by the radio base station responsive at a request of the radio terminal to the radio base station, the radio terminal comprising:
   a transmission power controller that makes, during communication through an uplink data channel at a first data rate from the radio terminal to the radio base station using first transmission power granted by the radio base station, transmission power higher than the first transmission power available for transmission through the uplink data channel at a second data rate higher than the first data rate by reducing transmission power to be used for transmission through the uplink control channel, which is different from the uplink data channel, from the radio terminal to the radio base station; and
   a transmission power increase requesting unit that requests the radio base station to grant transmission power higher than the first transmission power for the uplink data channel.

8. A radio terminal according to claim 7, wherein said transmission power controller reduces the transmission power to be used for transmission through the uplink control channel by controlling a transmission state of a transmission period of the uplink control channel to be a discontinuous transmission state.

9. A radio terminal according to claim 8, wherein the transmission period has originally been reserved for transmitting a reception result of data received through a downlink data channel from the radio base station.

10. A radio terminal according to claim 9, wherein said transmission power controller controls the transmission state of the uplink control channel such that the transmission state of the transmission period is in the discontinuous transmission state if information indicating an abnormal reception of the data is to be transmitted using the transmission period.

11. A radio terminal according to claim 8, wherein the transmission period has originally been reserved for transmitting reception quality information to the radio base station.

12. A radio terminal according to claim 11, wherein said transmission power controller controls the transmission state of the uplink control channel such that the transmission state of the transmission period is in the discontinuous transmission state if reception quality information indicating identical or better reception quality than preceding quality information transmitted to the radio base terminal is to be transmitted.

* * * * *